(12) United States Patent
Wang et al.

(10) Patent No.: US 10,202,533 B2
(45) Date of Patent: Feb. 12, 2019

(54) HIGH-TEMPERATURE HIGH-PRESSURE (HTHP) STABLE SYNTHETIC POLYMER FOR WATER BASED OIL-WELL SERVICING FLUIDS

(71) Applicant: ISP INVESTMENTS INC., Wilmington, DE (US)

(72) Inventors: Janice Jianzhao Wang, Hockessin, DE (US); Mohand Melbouci, Wilmington, DE (US); Jeffrey Lynn, Long Valley, NJ (US); Cuiyue Lei, Wayne, NJ (US); Osama M. Musa, Kinnelon, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 11 days.

(21) Appl. No.: 14/911,114

(22) PCT Filed: Apr. 28, 2014

(86) PCT No.: PCT/US2014/035665
§ 371 (c)(1),
(2) Date: Feb. 9, 2016

(87) PCT Pub. No.: WO2014/209485
PCT Pub. Date: Dec. 31, 2014

(65) Prior Publication Data
US 2016/0272868 A1   Sep. 22, 2016

Related U.S. Application Data

(60) Provisional application No. 61/840,107, filed on Jun. 27, 2013.

(51) Int. Cl.
| | |
|---|---|
| C09K 8/12 | (2006.01) |
| C09K 8/035 | (2006.01) |
| C08F 226/10 | (2006.01) |
| C09K 8/512 | (2006.01) |
| C09K 8/42 | (2006.01) |
| C09K 8/508 | (2006.01) |
| C09K 8/528 | (2006.01) |
| C09K 8/588 | (2006.01) |
| C09K 8/60 | (2006.01) |
| C09K 8/68 | (2006.01) |
| C09K 8/88 | (2006.01) |

(52) U.S. Cl.
CPC .............. *C09K 8/12* (2013.01); *C08F 226/10* (2013.01); *C09K 8/035* (2013.01); *C09K 8/42* (2013.01); *C09K 8/5083* (2013.01); *C09K 8/512* (2013.01); *C09K 8/528* (2013.01); *C09K 8/588* (2013.01); *C09K 8/605* (2013.01); *C09K 8/608* (2013.01); *C09K 8/685* (2013.01); *C09K 8/882* (2013.01); *C09K 8/887* (2013.01); *C09K 2208/22* (2013.01); *C09K 2208/26* (2013.01); *C09K 2208/28* (2013.01); *C09K 2208/32* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 4,079,011 A | 3/1978 | Tate | |
| 4,300,820 A | 11/1981 | Shah | |
| 5,080,809 A * | 1/1992 | Stahl ...................... | C08F 226/06 166/270.1 |
| 5,162,417 A * | 11/1992 | Chuang .................. | C08F 226/10 524/401 |
| 6,030,928 A * | 2/2000 | Stahl ...................... | C08F 226/06 507/121 |
| 6,465,397 B1 | 10/2002 | Patterson | |
| 6,590,050 B1 | 7/2003 | Bair et al. | |

OTHER PUBLICATIONS

International Search Report, PCT/US2014/035665 published on Dec. 3, 2014.

* cited by examiner

*Primary Examiner* — John J Figueroa
(74) *Attorney, Agent, or Firm* — William J. Davis

(57) ABSTRACT

Stable water based High-Temperature-High-Pressure (HTHP) and/or Non-HTHP crosslinked copolymers for oil and gas applications consist of (i) a crosslinked, linear polyvinyl amide/polymerizable carboxylic acid) copolymer, having a composition, by weight, of 25-75 wt. % of a vinyl amide monomer selected from vinyl pyrrolidone, vinyl caprolactam, N-vinyl-N-methylacetamide and mixtures thereof, and 25-75 wt. % of a polymerizable carboxylic acid monomer selected from acrylic acid, (meth)acrylic acid, crotonic acid, itaconic acid, maleic acid and mixture thereof; and (ii) a crosslinker in an amount of 0.01-5% based on weight of total monomers. Also discloses relevant compositions comprising said copolymer and method of use thereof.

21 Claims, No Drawings

HIGH-TEMPERATURE HIGH-PRESSURE (HTHP) STABLE SYNTHETIC POLYMER FOR WATER BASED OIL-WELL SERVICING FLUIDS

FILED OF THE INVENTION

The present application relates to oil and gas applications, and more particularly, to water based High-Temperature-High-Pressure (HTHP) drilling fluid compositions, process for preparing and method of use.

BACKGROUND OF THE INVENTION

As more and more challenging conditions are encountered in oilfield drilling operations, there is a need for high-performance rheology modifiers used in water-based drilling fluids. The enhanced performance of the drilling fluids, especially, the High-Temperature-High-Pressure (HTHP) compatibility will allow faster and safer drilling operations. A rheology modifier is a critical component in water-based drilling fluids to ensure a proper rheology profile which performs specific functions such as suspending weighting agents and hole-cleaning. Xanthan Gum is the most commonly used rheology modifier in water-based drilling fluids. The xanthan gum was known to start losing rheological properties at above 300° F., so it is not suitable for HTHP based drilling operations. Therefore, a desired rheology modifier should possess similar rheological properties, for example, highly shear thinning with enhanced thermal stability. These enhanced properties will allow successful drilling operations under HTHP conditions. Therefore, the development of such HTHP based rheology modifier is critically important to the oil and energy based industries where drilling plays a vital role. The HTHP compatible water-based drilling fluid will allow more environmental friendly drilling operations in a safe and efficient manner. Therefore, without a high performance rheology modifier, such drilling operations under HTHP conditions are extremely challenging.

U.S. Pat. No. 7,205,271 assigned to ISP Investments Inc. discloses a rheology modifier/hair styling resin consisting of a crosslinked, linear poly(vinyl amide/polymerizable carboxylic acid) copolymer having a composition, by weight, of 25 to 75% of a vinyl amide monomer selected from vinyl pyrrolidone, vinyl caprolactam, N-vinyl formamide, N-vinylacetamide, N-vinyl-N-methylacetamide and mixtures thereof, and 25 to 75% of a polymerizable carboxylic acid monomer selected from (meth)acrylic acid, crotonic acid, itaconic acid, maleic acid and mixtures thereof, and a crosslinker in an amount of 0.5 to 2% based on weight of total monomers, which is characterized by an aqueous solution having a viscosity of 55,000 cps at a pH of 9 (Brookfield RVT, T-bar C@ 10 RPM, 60 sec., 1% resin solids in water).

US Publication No. 20110218295 assigned to BASF SE discloses a new anionic associative rheology modifiers comprising as polymerized units (a) 25 to 85% by weight of acrylic acid (AA), (b) 10 to 60% by weight of N-vinyl pyrrolidone (VP), (c) 0.5 to 10% by weight of at least one cationic monomer, (d) 1 to 6% by weight of at least one of compounds (d1) or (d2).

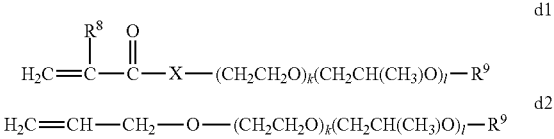

U.S. Pat. No. 5,211,858 assigned to Union Oil Company of California discloses a method for inhibiting the migration of a hazardous acid plume through a subterranean stratum, the method comprising the step of injecting into at least a portion of the acid plume a slug of a composition capable of forming a gel, the composition comprising: (a) a crosslinkable polymer; and (b) a lanthanide, wherein the crosslinkable polymer is selected from the group consisting of polyacrylamide and copolymers of acrylamide and (A) acrylic acid (B) Vinylpyrrolidone, (C) sodium 2-acrylamido-2-methylpropane sulfonate, and (D) mixtures of (A), (B), and (C).

U.S. Pat. No. 5,393,810A assigned to Halliburton Company disclose a compositions and methods which provide improved viscosity reduction of crosslinked hydratable polymer treating fluids in the presence of uncured resin-coated proppants. The uncured resins are generally uncured phenolic or furan resins. The breaker comprises an oxidizing agent to which is added a sequestering agent comprising a copolymer of vinylpyrrolidone and acrylic acid to sequester at least a portion of any phenolic extracts from said resin that may be present in said treating fluid from contact with the uncured resin.

US Publication No. 20080193395 assigned to BEIERSDORF AG disclose a cosmetic preparation containing (a) one or more water-soluble UV photo protective filters selected from the group of the compounds 2-phenylbenzimidazole-5-sulfonic acid and the sodium, potassium and triethanolammonium salts thereof as well as phenylene-1,4-bis-(2-benzimidazyl)-3,3'-5,5'-tetrasulfonic acid and the sodium, potassium and triethanolammonium salts thereof, (b) a copolymer of vinylpyrrolidone (VP) and acrylic acid (AA).

In view of the foregoing, it is an object of the present application to provide high performance rheology modifiers which is (i) capable retaining its original rheological properties even at high temperatures i.e. beyond 300° F.; (ii) compatible for water based oil field drilling operations under HTHP conditions; and (iii) capable to providing highly shear thinning property with enhanced thermal stability.

Surprisingly, we have found that the use of crosslinked, linear poly(vinyl amide/polymerizable carboxylic acid) copolymer is able to provide required high performance rheological properties which are suitable for HTHP water based oil-well servicing fluids. Such copolymer may be used alone or in combination with other at least one HTHP or Non-HTHP based Rheology Modifiers (RMs), Fluid Loss Additives (FLA's) and/or dispersants that are known in the prior arts.

SUMMARY OF THE INVENTION

The primary objective of the present application is to provide a stable water based High-Temperature-High-Pressure (HTHP) and/or Non-HTHP based drilling fluid composition comprising a new copolymer for oil and/or gas applications, and wherein, said composition consists of (i) a crosslinked, linear of poly(vinyl amide/polymerizable carboxylic acid) copolymer, having a composition, by weight, of 25-75 wt. % of a vinyl amide monomer selected from vinyl pyrrolidone, vinyl caprolactam, N-vinyl-N-methylacetamide and mixtures thereof, and 25-75 wt. % of a polymerizable carboxylic acid monomer selected from acrylic acid, (meth)acrylic acid, crotonic acid, itaconic acid, maleic acid and mixture thereof; and (ii) a crosslinker in an amount of 0.01-5% based on weight of total monomers; and wherein, the crosslinked, linear poly(vinyl amide/polymerizable carboxylic acid) copolymer can be characterized by an aqueous solution having a viscosity of about 30,000 to 90,000 cps at pH 9, and wherein, the Brookfield RVT, T-Bar C @ RPM, 60 Sec, 1% resin solids in water.

Yet another aspect of the present application provides that the crosslinked, linear copolymer of poly(vinyl amide/polymerizable carboxylic acid) can be used in oil and gas application as rheology modifier/thickener/suspension agent for drilling/drill-in fluids, completion fluids, work-over fluids, packer fluids, cementing suspending aid, friction reducer in oil-well stimulation fluid, shale swell inhibitor/clay stabilizer, fluid loss additive, viscosifier of water based drilling fluids, filtration control, viscosifier for oil-well stimulation, and/or polymer flooding for enhanced oil recovery.

One another aspect of the present application is to provide a stable water based High-Temperature-High-Pressure (HTHP) and/or Non-HTHP drilling fluid comprising: (i) fresh water or brine solution as base fluid, (ii) about 0.5 ppb to about 10 ppb of a crosslinked or linear poly(vinyl amide/polymerizable carboxylic acid) copolymer as rheology modifier; (iii) about 0 to about 25 ppb of a dual-functional tetrapolymer of (AM/AMPS/AHPS/AA) that can function as both HT rheology modifier and HTHP based Fluid Loss Additive (FLA); (iv) about 0 to 25 ppb of HTHP or non-HTHP based Fluid loss additives, (v) about 80 ppb to about 400 ppb of weighting agents; (vi) optionally about 0 ppb to about 30 ppb of drilling solids; and (vii) optionally, about 0 to about 30 ppb of at least one dispersing agents.

Another aspect of the present application is to provide a stable water based High-Temperature-High-Pressure (HTHP) and/or Non-HTHP completion fluid, having a density of from about 8.3 to 21.0 ppg, comprising: (i) brine based fluids; (ii) about 0.5 ppb to about 10 ppb of a crosslinked, linear poly(vinyl amide/polymerizable carboxylic acid) copolymer based rheology modifier; (iii) optionally about 0 to 25 ppb of a dual-functional polymer of poly(AM/AMPS/AHPS/AA); and (iv) optionally about 5 ppb to 100 ppb bridging agent.

A further aspect of the present application is to provide a stable water based High-Temperature-High-Pressure (HTHP) and/or Non-HTHP drill-in fluids composition, having a density of from about 8.3 to about 21.0 ppg, comprising: (i) brine based fluids; (ii) about 0.5 ppb to about 10 ppb of a crosslinked, linear poly(vinyl amide/polymerizable carboxylic acid) copolymer based rheology modifiers; (iii) about 0-25 ppb of Fluid Loss additives. (iv) optionally about 0 to 25 ppb of a dual-functional polymer additive of poly(AM/AMPS/AHPS/AA); and (v) about 5 ppb to about 100 ppb of bridging agents such as $CaCO_3$, or sized salts.

DETAILED DESCRIPTION OF THE INVENTION

While this specification concludes with claims particularly pointing out and distinctly claiming that which is regarded as the invention it is anticipated that the invention can be more readily understood through reading the following detailed description of the invention and study of the included examples.

By the term "comprising" herein is meant that various optional, compatible components can be used in the compositions herein, provided that the important ingredients are present in the suitable form and concentrations. The term "comprising" thus encompasses and includes the more restrictive terms "consisting of" and "consisting essentially of" which can be used to characterize the essential ingredients such as fresh water, brine, rheology modifier (RM), HTHP or non-HTHP based fluid loss additive (FLA), drilling solid, weighting agent of the present application.

All references to singular characteristics or limitations of the present invention shall include the corresponding plural characteristic or limitation, and vice-versa, unless otherwise specified or dearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

As used herein, the words "preferred," "preferably" and variants refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

References herein to "one embodiment," "one aspect", "one version" or "one objective" of the invention include one or more such embodiment, aspect, version or objective, unless the context clearly dictates otherwise.

All publications, articles, papers, patents, patent publications, and other references cited herein are hereby incorporated herein in their entireties for all purposes to the extent consistent with the disclosure herein.

The unit "pounds per barrel" can also be specified as "ppb" or "lbm/bbl", and wherein one lbm/bbl or ppb is the equivalent of one pound of additive in 42 US gallons of mud. The "m" is used to denote mass to avoid possible confusion with pounds force (denoted by "lbf"). In SI units, the conversion factor is one pound per barrel equals 2.85 kilograms per cubic meter. For example, 10 lbm/bbl=28.5 $kg/m^3$.

The term "crosslinked" herein refers to a composition containing intra-molecular and/or intermolecular crosslinks, whether arising through a covalent or non-covalent bonding. "Non-covalent" bonding includes both hydrogen bonding and electrostatic (ionic) bonding.

The term "monomer" refers to the repeat units that comprise a polymer. A monomer is a compound that chemically bonds to other molecules, including other monomers, to form a polymer.

The term "polymer" refers to both linear and branched polymers derived from one or more monomer units, which may or may not be crosslinked, or grafted. Non-limiting examples of polymers include copolymers, terpolymers, tetramers, and the like, wherein the polymer is random, block, or alternating polymer.

The present application is directed to a thermally-stable polymer suitable for use under HTHP conditions. HTHP refers generally to wells that are hotter or at higher pressure than most wells. In accordance with some aspects, HTHP may refer to a well having an undisturbed bottom-hole temperature of greater than 300° F. [149° C.] and a bottom-hole pressure of at least 5000 psi (~34.5 Mpa).

What is described here is a stable water based High-Temperature-High-Pressure (HTHP) and/or Non-HTHP crosslinked, linear copolymer for oil and gas applications consisting of (i) a crosslinked, linear poly(vinyl amide/polymerizable carboxylic acid) copolymer, having a composition, by weight, of 25-75 wt. % of a vinyl amide monomer selected from vinyl pyrrolidone, vinyl caprolactam, N-vinyl-N-methylacetamide and mixtures thereof, and 25-75 wt. % of a polymerizable carboxylic acid monomer selected from acrylic acid, (meth)acrylic acid, crotonic acid, itaconic acid, maleic acid and mixture thereof; and (ii) a crosslinker in an amount of 0.01-5% based on weight of total monomers; and wherein, the copolymer is characterized by an aqueous solution having a viscosity of about 30,000 to 90,000 cps at pH of 9 and wherein, the Brookfield RVT, T-bar C @ 10 RPM, 60 sec, 1% resin solids in water.

Suitable vinyl amides based monomer of the present application would include but not limited to vinyl pyrrolidone, vinyl caprolactam, N-vinyl formamide, N-vinylacetamide, N-vinyl-N-methylacetamide and mixtures thereof, preferably vinyl lactam based monomer such as vinyl pyrrolidone.

It is contemplated to employ other vinyl amide and/or vinyl lactam based monomers for the present application would include but not limited to N-vinyl formamide, N-vinyl-N-methyl formamide, N-vinyl-N-ethyl formamide, N-vinyl-N-(n-propyl)formamide, N-vinyl-N-isopropyl formamide, N-vinyl acetamide, N-vinyl-N-methyl acetamide, N-vinyl-N-ethyl acetamide, N-vinyl-N-(n-propyl)acetamide, N-vinyl-N-isopropyl acetamide, N-vinyl propionamide, N-vinyl-N-methyl propionamide, N-vinyl-N-ethyl propionamide, N-vinyl-N-(n-propyl)propionamide, N-vinyl-N-isopropyl propionamide, N-vinylbutanamide, N-vinyl-N-methyl butanamide, N-vinyl-N-ethyl butanamide, N-vinyl-N-(n-propyl)butanamide, N-vinyl-N-isopropyl butanamide, N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, derivatives thereof, and blends thereof. Particularly useful N-vinyl lactams include N-vinyl-2-pyrrolidone, N-vinyl-2-piperidone and N-vinyl-2-caprolactam, derivatives thereof, and blends thereof.

Suitable polymerizable carboxylic acids of the present application would include but not limited to acrylic acid, (meth)-acrylic acid, crotonic acid, itaconic acid, maleic acid and mixtures thereof, preferably acrylic acid (AA).

Suitable crosslinkers for preparing crosslinked copolymers of the present application is required to have at least two free radically polymerizable groups in the molecule, such molecules are selected from the group consisting of Pentaerythritol-tri-allylether, Pentaerythritol-di-allylether, Pentaerythritol-di-(meth)acrylate, Pentaerythritol tri(meth)acrylate, Pentaerythritol-tetra-(meth)acrylate, Divinylimidazolidone (DVI), N,N',N''-triallyl-triazine-trione, Methyene-bis-acryamide, Methylene-bis-(meth)acrylamide, Triallylamine, Triallylglucose, Ethyleneglycol-di-(meth)acrylate, Diethyleneglycol-di-(meth)acrylate, Triethyleneglycol-di-(meth)acrylate, Tetraethyleneglycol-di-(meth)acrylate, Polyethyleneglycol-di-(meth)acrylate, 1-vinyl-3-(E)-ethylidene-pyrrolidone (EVP), Allyl methacrylamide, allyl glycidyl ether, glycidyl acrylate, hydroxyacrylamide and Divinylbenzene.

Further, it is contemplated to employ other possible crosslinking agents for the present application is selected from the group consisting of melamines, formaldehyde, chromates, polyfunctional silanes, zirconates, borates, polyfunctional acids, poly functional amines, alkylamino derivatives of methacrylic acids, alkylamino derivatives of methacrylamides, acid anhydrides, unsaturated aliphatic acids, vinyl derivatives, silanes, oxirane based glycidyl ethers, glycidyl acrylates, epoxy compounds, acrylic anhydrides, oxazoline derivatives, benzoxazine compounds, aziridine compounds, aziridine derivatives of methacrylates, isocyano derivatives of methacrylate, carbamic acid derivatives, sulfonate ester compounds, sulfonyl compounds, carbodiimide compounds, allyl compounds alone or in combination.

The copolymer according to the present application may readily be synthesized by the procedures that are known to a person skilled in the relevant art, and such free radical polymerization methods include but not limited to precipitation polymerization, inverse emulsion polymerization, gel polymerization, dispersion polymerization, solution polymerization, emulsion polymerization, bulk polymerization, suspension polymerization, or Liquid dispersion polymerization (LDP). The polymers can also be made through ionic polymerization.

Other preferred polymerization techniques employed to carry out the said copolymer of present application is duly disclosed in (1) "Principles of Polymerization" $4^{th}$ edition, 2004, Wiley by George Odian and (2) WO2012061147A1 assigned to ISP Investments Inc. is referred and disclosed herein in its entirety. Further, the polymerization of copolymer of the present application optionally may require a suitable catalysts or initiators, stabilizers, salts, pH adjusting agents, co-dispersants, thickeners, solvents, acidic agents, basic agents, and/or photoinitiators depends on type of polymerization technique being employed, and one skilled in the art can easily derive such information from the relevant literature known in the prior-art or from "Principles of Polymerization" $4^{th}$ edition, 2004, Wiley by George Odian.

The polymers of the present application is thermally-stable, in particular, to a polymer suitable for use under HTHP conditions, and wherein HTHP refers generally to wells that are hotter or at higher pressure than most wells. In accordance with some aspects, HTHP may refer to a well having an undisturbed bottom-hole temperature of greater than 300 F [149° C.] and a bottom-hole pressure of greater than 5000 psi (~34.5 Mpa).

According to one embodiment of the present application, the polymer can also be employed in Non-HTHP conditions as well, and wherein, the Non-HTHP condition would include temperature ranging from ambient to about 250° F.

A particularly preferred embodiment of the present application provides a process for preparing crosslinked poly (vinyl amide/polymerizable carboxylic acid) copolymer of the present application comprising precipitation polymerization, by wt. 5-50%, preferably 10-40%, of a mixture of a vinyl amide, a polymerizable carboxylic acid and a crosslinker, in the presence of 50-95%, preferably 60-90%, of a non-polar, removable organic solvent, and 0.05-5%, preferably 0.1-1%, of a free radical initiator, based on total weight of monomers. The copolymer of the present application is made according to U.S. Pat. No. 7,205,271 assigned to ISP Investments Inc. and this reference is disclosed herein in its entirety.

Another important embodiment of the present application provides a stable water based High-Temperature-High-Pressure (HTHP) and/or Non-HTHP drilling fluid comprising: (i) fresh water and/or brine solution as a base fluid, (ii) about 0.5 ppb to about 10 ppb of a crosslinked, linear poly(vinyl amide/polymerizable carboxylic acid) copolymer as a rheology modifier; (iii) about 0 to about 25 ppb of a dual-functional polymer, (iv) about 0 to about 25 ppb of HTHP or non-HTHP based FLAs; (v) about 80 ppb to about 400 ppb of weighting agents; (iv) optionally about 0 ppb to about 30 ppb of drilling solids; and (vii) optionally about 0 ppb to about 30 ppb of at least one dispersing agents.

The preferred copolymer for the above said stable water based High-Temperature-High-Pressure (HTHP) and/or Non-HTHP drilling fluid is a crosslinked, linear copolymer of poly(vinylpyrrolidone/acrylic acid) or Poly(VP/AA), and wherein, the suitable amount of Poly(VP/AA), a desired HT Rheology Modifier of the present application is in the range of from about 0.5 ppb to 10 ppb.

According to one preferred embodiment of the present application a dual-functional polymer which is provided is capable to functioning as a Rheology Modifier (RM) and/or Fluid Loss Additive (FLA), for the present application, said dual-functional polymer is selected from the group consisting of a tetrapolymer obtained by polymerizing (i) an acrylamide (AM) or a substituted acrylamide selected from the group consisting of N-methacrylamide, N-isopropylacrylamide, N-butylacrylamide, N,N-dimethylacrylamide, or N-hydroxymethylacrylamide; (ii) a monomer containing sulfonate functionality is 2-acrylamido-2-methylpropanesulfonic acid (AMPS); (iii) a substituted allyl alkylene ether compound is selected from the group consisting of 3-allyloxy-hydroxy-propanephosphate, 3-allyloxy-hydroxy-propanesulfonate, and 3-allyloxy-hydroxy-propanephosphite; and, (iv) a monomer containing carboxylic acid functionality is selected from the group consisting of acrylic acid, methacrylic acid, maleic acid or anhydride, itaconic acid, crotonic acid, fumaric acid, and citraconic acid; and a crosslinker in an amount of 0.1-5% based on weight of total monomers.

The dual-functional polymer of the present application is a crosslinked polymer of (i) an acrylamide (AM); 2-acrylamido-2-methylpropanesulfonic acid (AMPS); (iii) 3-allyloxy-hydroxy-propanesulfonate (AHPS); and, (iv) acrylic acid (AA); and wherein, N,N-methylene-bis-acrylamide is a preferred crosslinker.

According to one aspect of the present application, the drilling fluid composition can advantageously employ any appropriate additional Rheology Modifiers (RMs) and Fluid Loss Additives (FLAs) along with claimed Rheology Modifiers (RMs) and Fluid Loss Additives (FLAs) of the present application. The additional Rheology Modifiers (RMs) and Fluid Loss Additives (FLAs) may be selected from the prior arts that are known for a person skilled in the relevant art.

Other suitable Rheology Modifier of the present application would include but not limited to a terpolymer of acrylamide (AM)/2-acrylamido-2-methyl propanesulfonic acid (AMPS)/hydrophobe; a terpolymer of acrylamide (AM)/2-acrylamido-2-methyl propanesulfonic acid (AMPS)/$C_{12-25}$ alkyl acrylate; carboxymethyl cellulose, hydroxyethylcellulose, carboxymethylhydroxyethyl cellulose, sulphoethylcellulose; starch derivatives/crosslinked starch derivatives including carboxymethyl starch, hydroxyethylstarch, hydroxypropyl starch; bacterial gums including xanthan, welan, diutan, succinoglycan, scleroglucan, dextran, pullulan; plant derived gums such as guar gum, locustbean gum, tara gum and their derivatives, polyanionic cellulose (PAC), hydroxyethyl cellulose (HEC), Hydroxypropyl cellulose (HPC), carboxymethyl hydroxyethyl cellulose (CMHEC), carboxymethyl cellulose (CMC), xanthan gum, guar gum, and mixtures thereof.

Suitable additional Fluid Loss Additives of the present application would include but not limited to Polydrill, Alcomer 242 and Alcomer 507 from BASF, KEM-SEAL from Baker Hughes, DURALON from MI-Swaco, DRISCAL D from Drilling Specialties, Hostadrill from Clariant, Therma-chek from Halliburton, terpolymer of acrylamide (AM)/2-acrylamido-2-methyl propanesulfonic acid (AMPS)/cationic monomers, carboxymethyl cellulose, carboxyethyl cellulose, lignite, xanthan gum, starch, hydroxy methyl cellulose, hydroxy ethyl cellulose, guar gum, hydroxy propyl guar, hydroxy ethyl guar, and mixtures thereof.

Additional dual-functional polymer of the present application is vinylamide/vinyl sulfonic acid copolymer, e.g. Hostadrill (Clariant) which is capable of controlling downhole filtration and their rheology properties in water based drilling applications, completion and workover fluids at an elevated temperature conditions.

The required amount of FLA for the desired composition of the present application is in the range of from about 0 ppb to about 5 ppb; about 5 ppb to about 10 ppb; about 10 ppb to about 15 ppb; about 15 ppb to about 20 ppb; and about 20 ppb to about 25 ppb.

The stable water based high-temperature high-pressure (HTHP) and Non-HTHP drilling fluid of the present application comprises at least one weighting agent to provide the increased density to the composition. The weighting agent is primarily used to increase the density of fluids and control the fluid pressure to prevent blowout.

It is contemplated to employ a substance that is denser than water and does not adversely affect other properties of the mud composition can be added to raise the density to the desired level. The solubility of salts limits their range of usefulness, and there are other limitations associated with the use such systems. Therefore, various finely-ground solid materials can be used as a weighting agent. Several factors in addition to chemical inertness and specific gravity affect the use of a substance as a weighting material. Firstly, the substance should be available in large quantities. Secondly, it should easily be grounded to the preferred particle size distribution, having relatively non-abrasive nature. It should also be moderate in cost, and not injurious or objectionable to the drilling crew or the surroundings.

In an exemplary embodiment, the weighting agent may be selected from the group including but not limited to Galena, barite, hematite, illmenite, calcite, dolomite, siderite, Celestite magnetite, iron oxide, and mixtures thereof. The suitable ranges of the weighting agents for the present application are used in an amount required to achieve the density of 8.3 to 21.0 ppg.

In a different embodiment, the aqueous drilling fluid composition of the present application employs either (i) fresh water or (ii) a suitable brine solution as a base fluid during drilling operations. The drilling fluid composition of the present application may also comprise seawater or a solution of a salt or a solution of a combination of salts required thereof.

Generally, the brine solution is present in an amount to achieve the density of from about 8.3 to 21.0 ppg. The brine solution may be an aqueous solution of one or more density-increasing water-soluble salt. The density increasing water-soluble salt may be selected from the group consisting of alkali metal halides (for example, sodium chloride, sodium bromide, potassium chloride, potassium bromide, magnesium chloride, ammonium chloride) alkali metal carboxylates (for example, sodium formate, potassium formate, caesium formate, sodium acetate, potassium acetate or caesium acetate), sodium carbonate, potassium carbonate, alkaline earth metal halides (for example, calcium chloride and calcium bromide), and zinc halide salts (zinc chloride, zinc bromide) and mixtures thereof. The salt for preparing the brine of present application is selected from the group consisting of sodium chloride, potassium chloride, calcium chloride, magnesium chloride, ammonium chloride, zinc chloride, sodium bromide, calcium bromide, zinc bromide, potassium formate, cesium formate, sodium formate and mixtures thereof.

According to another embodiment of the present application, at least one drilling solid agent is employed to provide enhanced viscosity, density, gel strength to the drilling fluid or mud, and thus gives it good suspension capacity to oppose any settling of the cuttings.

Examples of suitable drilling solid may be selected from the group consisting of but not limited to clays bentonite, attapulgite, hectorite, sepiolite, and the synthetic minerals Laponite™ (a synthetic hectorite ex Rockwood Additives Limited) and mixed metal hydroxides. Other clays which may be present in the fluids include kaolinite and illite which can be contaminants arising from drilled shale formations. Some of the shale cuttings inevitably become dispersed in a wellbore fluid as fine illite and kaolinite clay particles. The preferred drilling solid of the present application is finely divided clay particles selected from the group consisting of bentonite, sodium bentonite, attapulgite, sepiolite, saponite, hectorite and mixtures thereof. Suitable range of drilling solids for the present application is in the range of from about 0 to about 30 ppb of the total composition. Other preferred range of drilling solid would include but not limited to 0 to 15 ppb.

According to another embodiment of the present application, it is contemplated to employ optionally a dispersing agent to achieve desired rheological quality of the drilling fluid before aging (BHR). Such dispersing agents or dispersants may be selected from the prior-arts of related field of applications that are known for a person skilled in the art. However, the preferred dispersing agent would include but not limited to plant tannins, lignites, lignosulfonates, polyphosphates, phosphonates, polyacrylates, low molecular weight cellulosic derivatives, polymaleates, poly(maleate/allylsulfonate) and the like. The most preferred dispersing agent of the present application is poly(maleate/allylsulfonate) based polymer.

The water based drilling fluid of the present application may comprise additional additives for improving the performance of drilling operations with respect to one or more properties. Examples of such additional additives may be selected from the group including but not limited to bactericides, detergents and emulsifiers, solid and liquid lubricants, gas-hydrate inhibitors, corrosion inhibitors, defoaming agents, scale inhibitors, enzymes, oxidizing polymer-breakers, emulsified hydrophobic liquids such as oils, acid gas-scavengers (such as hydrogen sulfide scavengers), thinners (such as lignosulfonates), demulsifying agents and surfactants designed to assist the clean-up of invaded fluid from producing formations, polymeric additives, dispersants, shale stabilizers or inhibitors, pH controlling agents, wetting agents, biopolymers, pH controlling agents or mixture thereof. Preferred additives would include polymeric additives, filtration control additives, dispersants, shale stabilizers or inhibitors, clay swell inhibitors, pH controlling agents or buffers, emulsifiers, antifoaming agents, wetting agents, surfactants, corrosion inhibitors, lubricants, biocides or mixture thereof.

The desired copolymer of the present application is used in oil and gas application as rheology modifier/thickener/suspension agent for drilling/drill-in fluids, completion fluids, work-over fluids, packer fluids, cementing suspending aid, friction reducer in oil-well stimulation fluid, shale swell inhibitor/clay stabilizer, fluid loss additive, viscosifier of water based drilling fluids, filtration control, viscosifier for oil-well stimulation, and/or polymer flooding for enhanced oil recovery.

The water based drilling fluid of the present application is suitable for high-temperature high-pressure (HTHP) drilling operations having a temperature greater than (>) 300° F., and wherein, the Non-HTHP drilling operations having a temperature of ambient to about 250° F.

Suitable pH for these water based drilling fluid compositions of the present application is in the range of from about 6.0 to about 13.0.

One important embodiment of the present application provides a method for conducting HTHP aging test to evaluate high temperature thermal stability of Rheology Modifiers of the present application through dynamic or hot rolling conditions. The detailed experimental process comprises as follows: rheology measurements of the drilling fluids after preparation (BHR), and rheology measurements of the drilling fluids after static or hot-rolling (AHR) for 16 hours at test temperatures.

A very important embodiment of the present application provides a stable water based High-Temperature-High-Pressure (HTHP) and/or Non-HTHP drilling fluid comprising: (i) brine solutions and/or fresh water as base fluids, (ii) a rheology modifier consisting of (a) crosslinked, linear poly (vinyl pyrrolidone/acrylic acid) copolymer, having a composition, by weight, of 25-75 wt. %, and 25-75 wt. % of a acrylic acid monomer; and (b) a crosslinker in an amount of 0.1 to 5 wt % based on weight of total monomers; (iii) a dual-functional polymer consisting of (a) an acrylamide (AM); (b) 2-acrylamido-2-methylpropanesulfonic acid (AMPS); (c) 3-allyloxy-hydroxy-propanesulfonate (AHPS); and, (d) acrylic acid (AA); and wherein, N,N-methylene-bis-acrylamide is a crosslinker for the tetrapolymer; (iv) about 0 ppb to about 25 ppb of HTHP or non-HTHP based Fluid Loss Additives (FLA); (v) about 80 ppb to about 400 ppb of weight agents; (vi) optionally about 0 ppb to about 30 ppb of drilling solids; and (vii) optionally about 0 ppb to about 30 ppb of at least one dispersing agents.

A particularly preferred embodiment of the present application provides a stable water based High-Temperature High-Pressure (HTHP) and/or Non-HTHP completion fluid, having a density of from about 8.3 to 21.0 ppg, comprising: (i) brine based fluids; (ii) about 0.5 ppb to about 10 ppb of a crosslinked, linear poly(vinyl amide/polymerizable carboxylic acid) copolymer, a rheology modifier; (iii) optionally about 0 to 25 ppb of a dual-functional polymer of poly(AM/AMPS/AHPS/AA); and (iv) optionally about 5 to 100 ppb bridging agent.

Another preferred embodiment of the present application provides a stable water based High-Temperature High-Pressure (HTHP) and/or Non-HTHP drill-in fluids composition, having a density of from about 8.3 to about 21.0 ppg, comprising: (i) brine based fluids; (ii) about 0.5 ppb to about 10 ppb of a crosslinked, linear poly(vinyl amide/polymerizable carboxylic acid) copolymer based a rheology modifiers; (iii) optionally about 0 to 25 ppb of a dual-functional polymer of poly(AM/AMPS/AHPS/AA); and (iv) about 5 ppb to about 100 ppb of bridging agents such as $CaCO_3$, or sized salts.

Accordingly, in a particularly useful embodiment of the present application there is provided a method of drilling a wellbore through a subterranean rock formation comprising (i) providing a drilling fluid composition of present application; (ii) pumping said drilling mud composition down tubing in the wellbore and through nozzles in a drilling bit attached to the bottom end of the tubing while rotating the bit to detach cuttings from the rock formation; and (iii) transporting the cuttings up the annulus between the tubing and the wellbore wall, the cuttings transport being facilitated by the flow of drilling fluid composition of the present application.

Another embodiment of the present application provides a method of completing a wellbore that penetrates through a porous and permeable subterranean rock formation comprising (i) providing a completion drilling fluid composition of present application; (ii) pumping said completion mud composition into the wellbore so that the formation fluid pressure and/or losses of completion fluid to the formation are controlled; and (iii) performing the operations required to complete the well.

In a different embodiment of the present application, there is provided a method of fracturing a rock formation comprising injecting a fracturing fluid into an wellbore across the rock formation that is to be fractured wherein the fracturing fluid comprises the composition of present application; and maintaining the pressure of the fracturing fluid at above the fracture pressure of the formation whereby the fractures grow and the drilling fluid composition of present application assists the transport of the proppant particles along the fractures and reduces the rate of leak-off of the fluid into the rock formation.

Further, the present invention is illustrated in detail by way of the below given examples. The examples are given herein for illustration of the invention and are not intended to be limiting thereof.

Example 1: Preparation of Drilling Mud Compositions

A ~12 ppg drilling fluid formulation as described in Table 1 was made on a 600 g scale containing weighting agents, a HT rheology modifier, a dual-functional polymer, and a sulfonate based polymer dispersant as shown in following Table 1. Sufficient mixing was required to facilitate dissolving of the polymer and avoid local viscosified agglomerates (fish eyes). The drilling fluids were allowed to agitate for 5 to 15 minutes between the addition of each component and with 30 to 50 minutes total for complete and homogenous mixing. Rheological properties were then measured on a Fann 35 before and after hot rolling (BHR and AHR) aging tests.

The 12 ppg drilling fluid fluids were prepared from the formulation provided in Table 1 and hot rolled under $N_2$ pressure of 350 psi for 400° F. for 16 hours aging. HTHP fluid loss tests on drilling fluid formulations were conducted in accordance with the procedures detailed in API RP 13B-1. BHR and AHR rheology results and HTHP Fluid loss control properties are provided in Tables 3 to 6.

The study of HT rheology modifier of this invention in 12-13.5 ppg drilling muds containing 55 ppb KCl and 5 ppb Bentonite demonstrated good rheology retention, with good mud suspension capability after aging (Table 1). The low end viscosities at 3/6 rpm are still high enough to suspend the mud weighting agents; the AHR YPs of 20 s for both muds reveals that AHR muds possess good pumpablity while still maintaining good suspension capabilities.

The study of HT rheology modifier of this invention in 12 ppg drilling muds containing 35 ppb KCl showed good thermal stability with exceptional mud rheology retention of PV, YP and suspension capability (Table 2). The low end viscosities at 3/6 rpm are still high enough to suspend the mud weighting agents; the AHR YPs in the range of 10-30 s for all three muds indicates that AHR muds possess good pumpability while still maintain good suspension capabilities.

The study of HT rheology modifiers of this invention in 16 ppg containing 35 ppb KCl drilling fluid composition revealed good rheology retention with good mud suspension capability after aging. Also, demonstrated significantly better PV and YP results (Table 3). The low end viscosities at 3/6 rpm are still high enough to suspend the mud weighting agents; the AHR YPs in the range of 20-30 s for all three muds indicates that AHR muds possess good pumpability while still maintain good suspension capabilities.

The study of HT rheology modifier of this invention in 11 ppg drilling muds containing 35 ppb KCl and 5 ppb Bentonite showed better thermal stability with excellent mud rheology retention of PV, YP and suspension capability (Table 4). The low end viscosities at 3/6 rpm are still high enough to suspend the mud weighting agents; the AHR YPs in the range of 20-30 s for all three muds indicates that AHR muds possess good pumpability while still maintain good suspension capabilities.

The study of HT rheology modifier of this invention in 16 ppg drilling muds containing 35 ppb KCl and 5 ppb Bentonite demonstrated good AHR PV, YP and suspension capability (Table 5). The muds containing HT Rheology modifier, a dual-functional polymer and/or a sulphonate based dispersant. (Formulations 12443632 and 12443-63-3) showed good AHR rheology, indicating the good suspension capability and pumpablity.

The study of HT rheology modifier of this invention in saturated NaCl for drill-in and completion fluids composition exhibited excellent rheology retention and suspension capabilities with or without dual-functional polymer after hot-rolling aging at 300-400° F. (Table 6).

While this invention has been described in detail with reference to certain preferred embodiments, it should be appreciated that the present invention is not limited to those precise embodiments. Rather, in view of the present disclosure, which describes the current best mode for practicing the invention, many modifications and variations would present themselves to those skilled in the art without departing from the scope and spirit of this invention.

TABLE 1

Study of HT RM in 12-13.5 ppg drilling fluid muds containing 55 ppb KCl + 5 ppb Bentonite

| Composition | Mixing time | 12443-50-1 | | | 12443-48-2 | | |
|---|---|---|---|---|---|---|---|
| Deionized water, ml | — | 249 | | | 230 | | |
| Pre-hydrated API non-treated Benotnite (28.6 ppb) | 5 min | 66.20 | | | 53 | | |
| KCl, ppb | 2 min | 55 | | | 55 | | |
| NaOH, 50%, ppb | 30 sec | 2.0 | | | 2.0 | | |
| Poly(VP/AA), ppb | 10 min | 2.0 | | | 2.3 | | |
| API Barite, ppb | 10 min | 190 | | | 320 | | |
| Aging Conditions | | 400 F./16 hr hot rolling aging | | | | | |
| Mud weight, ppg | | 12 | | | 13.5 | | |
| Fann data @120 F. | | BHR | AHR | R* (%) | BHR | AHR | R* (%) |
| 600 rpm | | 75 | 53 | 71 | 75 | 56 | 75 |
| 300 rpm | | 55 | 40 | 73 | 59 | 40 | 68 |
| 200 rpm | | 47 | 30 | 64 | 53 | 35 | 66 |
| 100 rpm | | 40 | 25 | 63 | 44 | 29 | 66 |
| 6 rpm | | 25 | 15 | 60 | 24 | 14 | 58 |
| 3 rpm | | 23 | 14 | 61 | 21 | 13 | 62 |
| 10 s gel, lb/100 ft² | | 23 | 13 | 57 | 20 | 12 | 60 |
| PV, cps | | 20 | 13 | 65 | 16 | 16 | 100 |
| YP, lb/100 ft² | | 35 | 27 | 77 | 43 | 24 | 56 |
| pH value | | 11.6 | 8.5 | — | 10.3 | 8.5 | — |

R*: Retention (%)

TABLE 2

Study of HT RM in 12 ppg drilling muds containing 35 ppb KCl

| Composition | Mixing time | 12443-57-1 | | | 12443-58-1 | | | 12443-57-3 | | |
|---|---|---|---|---|---|---|---|---|---|---|
| Deionized water, ml | — | 289 | | | 289 | | | 289 | | |
| KCl, ppb | 2 min | 35 | | | 35 | | | 35 | | |
| NaOH, 50%, ppb | 30 sec | 3.0 | | | 3.0 | | | 3.0 | | |
| AM/AMPS/AHPS/AA, ppb | 10 min | 0 | | | 5.0 | | | 5.0 | | |
| Poly(VP/AA), ppb | 10 min | 2.5 | | | 5.0 | | | 4.3 | | |
| Poly(maleate/allylsulfonate), 48%, ppb | 5 min | 0 | | | 0 | | | 2.5 | | |
| API Barite, ppb | 10 min | 180 | | | 180 | | | 180 | | |
| Aging conditions | | 400° F./16 hr hot rolling aging | | | | | | | | |
| Mud weight, ppg | | 12 | | | 12 | | | 12 | | |
| Fann data @120 F. | | BHR | AHR | R* (%) | BHR | AHR | R* (%) | BHR | AHR | R* (%) |
| 600 rpm | | 60 | 57 | 95 | 105 | 80 | 77 | 100 | 74 | 74 |
| 300 rpm | | 40 | 37 | 93 | 82 | 57 | 70 | 70 | 52 | 74 |
| 200 rpm | | 32 | 30 | 94 | 66 | 42 | 64 | 59 | 42 | 71 |
| 100 rpm | | 27 | 22 | 81 | 48 | 33 | 69 | 42 | 30 | 71 |
| 6 rpm | | 17 | 9 | 53 | 22 | 17 | 77 | 20 | 14 | 70 |
| 3 rpm | | 16 | 8 | 50 | 20 | 15 | 75 | 18 | 13 | 72 |
| 10 s gel, lb/100 ft$^2$ | | 15 | 8 | 53 | 22 | 16 | 73 | 18 | 13 | 72 |
| PV, cps | | 20 | 20 | 100 | 23 | 23 | 100 | 30 | 22 | 73 |
| YP, lb/100 ft$^2$ | | 20 | 17 | 85 | 59 | 34 | 59 | 40 | 30 | 75 |
| pH value | | 11.9 | 10.6 | — | 9.4 | 8.5 | — | 11.0 | 8.8 | — |

R*: Retention (%)

TABLE 3

Study of HT RM in 16 ppg drilling muds containing 35 ppb KCl

| Composition | Mixing time | 12443-58-2 | | | 12443-60-4 | | | 12443-60-5 | | |
|---|---|---|---|---|---|---|---|---|---|---|
| Deionized water, ml | — | 237 | | | 237 | | | 237 | | |
| KCl, ppb | 2 min | 35 | | | 35 | | | 35 | | |
| NaOH, 50%, ppb | 30 sec | 3.0 | | | 3.0 | | | 3.0 | | |
| Poly(VP/AA), ppb | 10 min | 2.3 | | | 2.2 | | | 2.2 | | |
| Tetrapolymer of AM/AMPS/AHPS/AA, ppb | 10 min | 0 | | | 3.0 | | | 3.0 | | |
| Poly(maleate/allylsulfonate) 48%, ppb | 5 min | 0 | | | 0 | | | 3.0 | | |
| API Barite, ppb | 10 min | 330 | | | 330 | | | 330 | | |
| Aging Conditions | | 400° F./16 hr hot rolling aging | | | | | | | | |
| Mud weight, ppg | | 16 | | | 16 | | | 16 | | |
| Fann data @120 F. | | BHR | AHR | R* (%) | BHR | AHR | R* (%) | BHR | AHR | R* (%) |
| 600 rpm | | 97 | 81 | 84 | 80 | 76 | 95 | 74 | 68 | 92 |
| 300 rpm | | 77 | 57 | 74 | 55 | 51 | 93 | 51 | 49 | 96 |
| 200 rpm | | 67 | 47 | 70 | 42 | 40 | 95 | 43 | 39 | 91 |
| 100 rpm | | 55 | 34 | 62 | 30 | 27 | 90 | 33 | 29 | 88 |
| 6 rpm | | 35 | 15 | 43 | 18 | 9 | 50 | 19 | 12 | 63 |
| 3 rpm | | 34 | 13 | 38 | 16 | 7 | 44 | 18 | 11 | 61 |
| 10 s gel, lb/100 ft$^2$ | | 35 | 13 | 37 | 16 | 6.5 | 41 | 18 | 10 | 56 |
| PV, cps | | 20 | 24 | 120 | 25 | 25 | 100 | 23 | 19 | 83 |
| YP, lb/100 ft$^2$ | | 57 | 33 | 58 | 30 | 26 | 87 | 28 | 30 | 107 |
| pH value | | 12.1 | 9.2 | — | 12.2 | 9.4 | — | 12.2 | 9.8 | — |

R*: Retention (%)

TABLE 4

Study of HT RM in 11 ppg drilling muds containing 35 ppb KCl and 5ppb Bentonite

| Composition | Mixing time | 12443-61-3 | | | 12443-61-4 | | | 12443-61-5 | | |
|---|---|---|---|---|---|---|---|---|---|---|
| Deionized water, ml | — | 289 | | | 289 | | | 289 | | |
| Pre-hydrated API Non-treated bentonite (28.6 ppb), ppb | 10 min | 66.2 | | | 66.2 | | | 66.2 | | |
| NaOH, 50%, ppb | 30 sec | 3.0 | | | 3.0 | | | 3.0 | | |
| KCl, ppb | 2 min | 35 | | | 35 | | | 35 | | |
| Tetrapolymer of AM/AMPS/AHPS/AA, ppb | 10 min | 0 | | | 6 | | | 6 | | |
| Poly(VP/AA), ppb | 10 min | 2.2 | | | 2.0 | | | 2.0 | | |
| Poly(maleate/allylsulfonate), 48%, ppb | 5 min | 0 | | | 0 | | | 3 | | |
| API Barite, ppb | 10 min | 180 | | | 180 | | | 180 | | |
| Aging conditions | | 400 F./16 hr hot rolling | | | | | | | | |
| Mud weight, ppg | | 11 | | | 11 | | | 11 | | |
| Fann data @120 F. | | BHR | AHR | R* (%) | BHR | ARH | R* (%) | BHR | AHR | R* (%) |
| 600 rpm | | 80 | 57 | 71 | 85 | 70 | 82 | 95 | 83 | 87 |
| 300 rpm | | 64 | 40 | 63 | 65 | 57 | 88 | 75 | 59 | 79 |
| 200 rpm | | 57 | 36 | 63 | 57 | 50 | 88 | 67 | 47 | 70 |
| 100 rpm | | 50 | 32 | 64 | 46 | 40 | 87 | 54 | 33 | 61 |
| 6 rpm | | 24 | 16 | 67 | 22 | 18 | 82 | 27 | 15 | 55 |
| 3 rpm | | 18 | 15 | 83 | 20 | 15 | 75 | 24 | 13 | 54 |
| 10 s gel, lb/100 ft$^2$ | | 25 | 16 | 64 | 19 | 15 | 79 | 24 | 13 | 54 |
| PV, cps | | 24 | 17 | 71 | 20 | 13 | 65 | 20 | 24 | 120 |
| YP, lb/100 ft$^2$ | | 40 | 23 | 58 | 45 | 44 | 98 | 55 | 35 | 64 |
| pH value | | 12.0 | 9.8 | — | 12.4 | 9.4 | — | 12.1 | 9.3 | — |

R*: Retention (%)

TABLE 5

Study of HT RM in 16 ppg drilling muds containing 35 ppb KCl & 5 ppb Bentonite

| Composition | Mixing time | 12443-63-1 | | | 12443-63-2 | | | 12443-63-3 | | |
|---|---|---|---|---|---|---|---|---|---|---|
| Deionized water, bbl (ml) | — | 177 | | | 177 | | | 177 | | |
| Prehydrate API Non-treated bentonite (18.6 ppb), ppb | 10 min | 66.2 | | | 66.2 | | | 66.2 | | |
| NaOH, 50%, ppb | 30 sec | 2.0 | | | 2.0 | | | 2.0 | | |
| KCl, ppb | 2 min | 35 | | | 35 | | | 35 | | |
| Tetrapolymer of AM/AMPS/AHPS/AA, ppb | 10 min | 0 | | | 6 | | | 6 | | |
| Poly(VP/AA), ppb | 10 min | 2.0 | | | 1.5 | | | 1.5 | | |
| Poly(maleate/allylsulfonate), 48%, ppb | 5 min | 0 | | | 0 | | | 4 | | |
| API Barite, ppb | 10 min | 330 | | | 330 | | | 330 | | |
| Aging conditions | | 400 F./16 hr hot rolling | | | | | | | | |
| Mud weight, ppg | | 16 | | | 16 | | | 16 | | |
| Fann data @120 F. | | BHR | AHR | R.* (%) | BHR | ARH | R* (%) | BHR | AHR | R* (%) |
| 600 rpm | | 250 | 83 | 33 | 115 | 78 | 68 | 168 | 64 | 38 |
| 300 rpm | | 240 | 72 | 29 | 80 | 60 | 75 | 140 | 47 | 34 |
| 200 rpm | | 235 | 68 | 29 | 70 | 55 | 79 | 127 | 40 | 31 |
| 100 rpm | | 215 | 60 | 28 | 58 | 45 | 78 | 108 | 32 | 29 |
| 6 rpm | | 110 | 34 | 31 | 37 | 20 | 54 | 60 | 16 | 27 |
| 3 rpm | | 100 | 31 | 31 | 34 | 18 | 53 | 45 | 15 | 33 |
| 10 s gel, lb/100 ft$^2$ | | 120 | 35 | 29 | 40 | 20 | 50 | 50 | 18 | 36 |
| PV, cps | | 10 | 11 | 110 | 35 | 18 | 51 | 28 | 17 | 61 |
| YP, lb/100 ft$^2$ | | 230 | 61 | 27 | 45 | 42 | 93 | 112 | 30 | 27 |
| pH value | | 10 | 8.8 | — | 10.0 | 8.9 | — | 10.0 | 9.0 | — |

R*: Retention (%)

TABLE 6

Study of HT RM in saturated NaCl for drill-in and completion fluids

| Composition | time | 12503-27-1 | | | 12503-27-2 | | | 12503-29-5 | | | 12503-29-6 | | | 12443-55-5 | | |
|---|---|---|---|---|---|---|---|---|---|---|---|---|---|---|---|---|
| 36% NaCl (saturated), ml | — | 340 ml | | | 340 ml | | | 340 ml | | | 340 ml | | | 300 ml | | |
| NaOH, 50%, ppb | 30 s | 3.0 | | | 3.0 | | | 3.0 | | | 3.0 | | | 4.0 | | |
| Poly(VP/AA), ppb | 10 m | 5.0 | | | 5.0 | | | 5.0 | | | 5.0 | | | 4.1 | | |
| Tetrapolymer of AM/AMPS/AHPS/AA, ppb | 10 m | 0 | | | 0 | | | 0 | | | 6.0 | | | 0 | | |
| CaCO$_3$, ppb | 10 m | 0 | | | 0 | | | 0 | | | 0 | | | 82 | | |

| | Aging conditions | 300 F./16 hr hot rolling | | | 350 F./16 hr hot rolling | | | 375 F./16 hr hot rolling | | | 375 F./16 hr hot rolling | | | 400 F./16 hr hot rolling | | |
|---|---|---|---|---|---|---|---|---|---|---|---|---|---|---|---|---|
| | Fluid density, ppg | 10 | | | 10 | | | 10 | | | 10 | | | 11.3 | | |
| Fann data @120 F. | | BHR | AHR | R* (%) | BHR | AHR | R (%) | BHR | AHR | R (%) | BHR | AHR | R (%) | BHR | AHR | R (%) |
| 600 rpm | | 51 | 52 | 102 | 54 | 53 | 98 | 47 | 48 | 102 | 69 | 61 | 88 | 65 | 59 | 91 |
| 300 rpm | | 35 | 37 | 106 | 38 | 37 | 97 | 32 | 33 | 103 | 45 | 41 | 91 | 45 | 38 | 84 |
| 200 rpm | | 29 | 30 | 103 | 31 | 30 | 97 | 26 | 27 | 104 | 36 | 32 | 89 | 35 | 29 | 83 |
| 100 rpm | | 21 | 21 | 100 | 22 | 21 | 95 | 18 | 19 | 106 | 24 | 22 | 92 | 23 | 20 | 87 |
| 6 rpm | | 9 | 8 | 89 | 9 | 8 | 89 | 7 | 7.5 | 107 | 8 | 8 | 100 | 9 | 6 | 67 |
| 3 rpm | | 7 | 7 | 100 | 8 | 7 | 88 | 6 | 6.5 | 108 | 7 | 7 | 100 | 8 | 5.5 | 69 |
| 10 s gel, lb/100 ft$^2$ | | 7 | 6.5 | 93 | 7 | 6 | 86 | 6 | 6 | 100 | 6.5 | 7 | 108 | 8 | 5.5 | 69 |
| PV, cps | | 16 | 15 | 94 | 16 | 16 | 100 | 15 | 15 | 100 | 24 | 20 | 83 | 20 | 21 | 105 |
| YP, lb/100 ft$^2$ | | 19 | 22 | 116 | 22 | 21 | 95 | 17 | 18 | 106 | 21 | 21 | 100 | 25 | 17 | 68 |
| pH value | | — | 9.6 | — | — | 9.4 | — | — | 10.2 | — | — | 8.3 | — | 10. | — | — |

R*: Retention (%)

What is claimed is:

1. A stable water based High-Temperature-High-Pressure (HTHP) copolymer for oil and gas applications consisting of (i) a crosslinked, linear poly(vinyl amide/polymerizable carboxylic acid) copolymer, having a composition, by weight, of 25-75 wt. % of a vinyl amide monomer selected from vinyl pyrrolidone, vinyl caprolactam, N-vinyl-N methylacetamide and mixtures thereof, and 25-75 wt. % of a polymerizable carboxylic acid monomer selected from acrylic acid, (meth)acrylic acid, crotonic acid, itaconic acid, maleic acid and mixture thereof; and (ii) a crosslinker in an amount of 0.01-5% based on weight of total monomers.

2. The copolymer according to claim 1, wherein the copolymer is characterized by an aqueous solution having a viscosity of from about 30,000 to about 90,000 cps at pH of 9 and wherein, the Brookfield RVT, T-bar C @ 10 RPM, 60 sec, 1% resin solids in water.

3. The copolymer according to claim 1, wherein said vinyl amide is vinyl pyrrolidone.

4. The copolymer according to claim 1, wherein said polymerizable carboxylic acid is acrylic acid (AA).

5. The copolymer according to claim 1, wherein said crosslinkers for preparing crosslinked copolymer has at least two free radical polymerizable groups in the molecule and are selected from the group consisting of Divinylimidazolidone (DVI), N,N',N"-triallyl-triazine-trione, Methyene-bis-acryamide, Methylene-bis-(meth)acrylamide, Triallyl amine, Triallylglucose, Ethyleneglycol-di-(meth)acrylate, Diethyleneglycol-di-(meth)acrylate, Triethyleneglycol-di-(meth)acrylate, Tetraethyleneglycol-di-(meth)acrylate, Polyethyleneglycol-di-(meth)acrylate, Pentaerythritol-tri-allylether, Pentaerythritol-di-allylether, Pentaerythritol-di-(meth)acrylate, Pentaerythritol tri(meth)acrylate, Pentaerythritol-tetra-(meth)acrylate, 1-vinyl-3-(E)-ethylidene-pyrrolidone (EVP), Allyl methacrylamide, allyl glycidyl ether, glycidyl acrylate, hydroxyacrylamide and/or Divinylbenzene.

6. The copolymer according to claim 1, wherein the copolymer is prepared by precipitation polymerization, reverse emulsion polymerization, liquid dispersion polymerization, gel polymerization, dispersion polymerization, solution polymerization, suspension polymerization, or bulk polymerization.

7. The copolymer according to claim 1, wherein said copolymer is used in oil and gas applications as rheology modifier/thickener/suspension agent for drilling/drill-in/packer fluids, cementing viscosifier, friction reducer in lime/fresh-water/brine based drilling, friction reducer in oil-well fracturing, shale swell inhibitor/clay stabilizer, fluid loss additive, viscosifier in fresh-water/seawater/saline based drilling fluids, filtration control, viscosifier for oil-well stimulation, drilling-aids for oil/water/geological drillings, completion fluids and work-over fluids, invert-drilling fluids, and/or polymer flooding for enhanced oil recovery.

8. A stable water based High-Temperature-High-Pressure (HTHP) drilling fluid composition comprising:
   i. fresh water and/or brine solution as base fluids;
   ii. about 0.5 ppb to about 10 ppb of crosslinked copolymer of claim 1 as rheology modifier;
   iii. about 0 ppb to about 20 ppb of a dual-functional polymer;
   iv. about 0 ppb to about 25 ppb of HTHP based Fluid Loss Additives (FLA);
   v. about 80 ppb to about 400 ppb of weighting agents;
   vi. optionally about 0 ppb to about 30 ppb of drilling solids; and
   vii. optionally about 0 ppb to about 30 ppb of at least one dispersing agents.

9. The aqueous drilling fluid composition according to claim 8, wherein said dual-functional polymer is capable of functioning as Rheology Modifiers and/or Fluid Loss Additives (FLA), is selected from the group consisting of a polymer obtained by polymerizing (i) an acrylamide (AM) or a substituted acrylamide selected from the group consisting of N-methacrylamide, N-isopropylacrylamide, N-butylacrylamide, N,N-dimethylacrylamide, or N-hydroxymethylacrylamide; (ii) a monomer containing sulfonate functionality is 2-acrylamido-2-methylpropanesulfonic acid (AMPS); (iii) a substituted allyl alkylene ether compound is selected from the group consisting of 3-allyloxy-hydroxy-propanephosphate, 3-allyloxy-hydroxy-propanesulfonate, and 3-allyloxy-hydroxy-propanephosphite; and, (iv) a monomer containing carboxylic acid functionality is selected from the group consisting of acrylic acid, methacrylic acid, maleic acid or anhydride, itaconic acid, crotonic acid, fumaric acid, and citraconic acid; and a crosslinker in an amount of 0.1-5% based on weight of total monomers.

10. The composition of claim 9 wherein said dual-functional polymer is a crosslinked tetrapolymer of (i) an acrylamide (AM); 2-acrylamido-2-methylpropanesulfonic acid (AMPS); (iii) 3-allyloxy-hydroxy-propanesulfonate (AHPS); and, (iv) acrylic acid (AA); and wherein, N,N-methylene-bis-acrylamide is a crosslinker.

11. The water based drilling fluid composition according to claim 8, further optionally comprising at least one additive ingredient selected from the group consisting of other additional rheology modifiers/fluid loss additives, polymeric additives, other or additional filtration control additives, dispersants, shale stabilizers or inhibitors, clay swell inhibitors, pH controlling agents or buffers, emulsifiers, antifoamers, wetting agents, surfactants, corrosion inhibitors, lubricants, biocides or mixture thereof.

12. The water based drilling fluid composition according to claim 8, wherein said weighting agent is selected from the group consisting of barite, hematite, manganese oxide, iron oxide, sized calcium carbonate, magnesium carbonate, aqueous soluble organic and inorganic salts and mixtures thereof.

13. The aqueous drilling fluid composition according to claim 8, wherein said brine solution is prepared from sodium chloride, potassium chloride, calcium chloride, magnesium chloride, ammonium chloride, zinc chloride, sodium bromide, calcium bromide, zinc bromide, potassium formate, cesium formate, sodium formate and mixtures thereof.

14. The aqueous drilling fluid composition according to claim 8, wherein said drilling solid is a finely divided clay particles selected from the group consisting of bentonite, non-treated bentonite, sodium bentonite, attapulgite, sepiolite, saponite, hectorite and mixtures thereof.

15. The water based drilling fluid composition according of claim 8 having a pH in the range of from about 6.0 to about 13.0.

16. A stable water based High-Temperature High-Pressure (HTHP) completion fluid composition, having a density of 8.3 to 21.0 ppg, comprising:
  i. brine based fluids;
  ii. about 0.5 ppb to about 10 ppb of the crosslinked copolymer of crosslinked copolymer of a crosslinked, linear poly(vinyl amide/polymerizable carboxylic acid) copolymer, having a composition, by weight, of 25-75 wt. % of a vinyl amide monomer selected from vinyl pyrrolidone, vinyl caprolactam, N-vinyl-N-methylacetamide and mixtures thereof, and 25-75 wt. % of a polymerizable carboxylic acid monomer selected from acrylic acid, (meth)acrylic acid, crotonic acid, itaconic acid, maleic acid and mixture thereof; and a crosslinker in an amount of 0.01-5% based on weight of total monomers as rheology modifier;
  iii. optionally about 0 to about 25 ppb of dual-functional polymer of selected from the group consisting of a polymer obtained by polymerizing (i) an acrylamide (AM) or a substituted acrylamide selected from the group consisting of N-methacrylamide, N-isopropylacrylamide, N-butylacrylamide, N,N-dimethylacrylamide, or N-hydroxymethylacrylamide; (ii) a monomer containing sulfonate functionality is 2-acrylamido-2-methylpropanesulfonic acid (AMPS); (iii) a substituted allyl alkylene ether compound is selected from the group consisting of 3-allyloxy-hydroxy-propanephosphate, 3-allyloxy-hydroxy-propanesulfonate, and 3-allyloxy-hydroxy-propanephosphite; and, (iv) a monomer containing carboxylic acid functionality is selected from the group consisting of acrylic acid, methacrylic acid, maleic acid or anhydride, itaconic acid, crotonic acid, fumaric acid, and citraconic acid; and a crosslinker in an amount of 0.1-5% based on weight of total monomers; and
  iv. optionally about 5 ppb to 100 ppb bridging agent.

17. The water based completion fluid composition according to claim 16, wherein said brine solution is prepared from sodium chloride, potassium chloride, calcium chloride, magnesium chloride, ammonium chloride, zinc chloride, sodium bromide, calcium bromide, zinc bromide, potassium formate, cesium formate, sodium formate and mixtures thereof.

18. The water based completion fluid composition according to claim 16 having a pH of from about 6.0 to about 13.0.

19. A stable water based High-Temperature High-Pressure (HTHP) drilling fluids composition, having a density of 8.3 to about 21.0 ppg, comprising:
  i. brine based fluids;
  ii. about 0.5 ppb to about 10 ppb of crosslinked copolymer of a crosslinked, linear poly(vinyl amide/polymerizable carboxylic acid) copolymer, having a composition, by weight, of 25-75 wt. % of a vinyl amide monomer selected from vinyl pyrrolidone, vinyl caprolactam, N-vinyl-N-methylacetamide and mixtures thereof, and 25-75 wt. % of a polymerizable carboxylic acid monomer selected from acrylic acid, (meth)acrylic acid, crotonic acid, itaconic acid, maleic acid and mixture thereof; and a crosslinker in an amount of 0.01-5% based on weight of total monomers as rheology modifiers;
  iii. optionally about 0 to about 25 ppb of dual-functional polymer selected from the group consisting of a polymer obtained by polymerizing (i) an acrylamide (AM) or a substituted acrylamide selected from the group consisting of N-methacrylamide, N-isopropylacrylamide, N-butylacrylamide, N,N-dimethylacrylamide, or N-hydroxymethylacrylamide; (ii) a monomer containing sulfonate functionality is 2-acrylamido-2-methylpropanesulfonic acid (AMPS); (iii) a substituted allyl alkylene ether compound is selected from the group consisting of 3-allyloxy-hydroxy-propanephosphate, 3-allyloxy-hydroxy-propanesulfonate, and 3-allyloxy-hydroxy-propanephosphite; and, (iv) a monomer containing carboxylic acid functionality is selected from the group consisting of acrylic acid, methacrylic acid, maleic acid or anhydride, itaconic acid, crotonic acid, fumaric acid, and citraconic acid; and a crosslinker in an amount of 0.1-5% based on weight of total monomers;
  iv. about 0 ppb to about 25 ppb of HTHP or non-HTHP based Fluid Loss Additives (FLA); and
  v. about 5 ppb to about 100 ppb of bridging agents are selected from $CaCO_3$ or sized salts.

20. The water based drill-in fluid composition according to claim 19, wherein said brine solution is prepared from sodium chloride, potassium chloride, calcium chloride, magnesium chloride, ammonium chloride, zinc chloride, sodium bromide, calcium bromide, zinc bromide, potassium formate, cesium formate, sodium formate and mixtures thereof.

21. The water based drill-in fluid composition according to claim 19 having a pH of from about 6.0 to about 13.0.

* * * * *